United States Patent

Ngwyen et al.

[15] 3,679,994

[45] July 25, 1972

[54] BROADBAND OPTICALLY PUMPED SEMICONDUCTIVE LASERS

[72] Inventors: Van-Tran Nguyen; Jagdeep Chandravadan Shah, both of Matawan, N.J.

[73] Assignee: Bell Telephone Laboratories, Incorporated, Murray Hill, N.J.

[22] Filed: May 20, 1971

[21] Appl. No.: 145,182

[52] U.S. Cl. ....................................331/94, 330/4, 330/4.3, 331/94.5

[51] Int. Cl. ....................................................H01s 3/18

[58] Field of Search ........................331/94, 94.5; 330/4, 4.3

*Primary Examiner*—Roy Lake
*Assistant Examiner*—Darwin R. Hostetter
*Attorney*—R. J. Guenther and Arthur J. Torsiglieri

[57] ABSTRACT

The disclosed optically pumped masers and lasers employ multiple valley semiconductive devices for amplification and oscillation in the millimeter or submillimeter frequency range. This operation results from the population inversion of carriers within continuum states of the conduction band. Electronic charge carriers are excited to the conduction band from impurity levels of from the valence band by one-photon or two-photon optical pumping. The energy of excited carriers is selected to be just below the intervalley energy gap. A small electric field is able to create a transfer of charge carriers between the two valleys in order to obtain the carrier population peak near the intervalley energy level. The combination of the optical pumping and the appropriate small electric field avoids Gunn instabilities. A moderate magnetic field increases available gain at the expense of oscillation bandwidth by providing discrete energy levels below the intervalley energy gap.

8 Claims, 4 Drawing Figures

INVENTORS V. NGUYEN
J. C. SHAH
BY Wilford L. Wisner
ATTORNEY

BROADBAND OPTICALLY PUMPED SEMICONDUCTIVE LASERS

BACKGROUND OF THE INVENTION

This invention relates to devices for the stimulated emission of coherent radiation, including masers and lasers, and to such devices in which a multiple valley semiconductive medium is the active medium.

The term multiple valley semiconductive material or device relates to a material or device in which the energy versus momentum relationships of charge carriers can be described by curves which differ for different directions of propagation of the carriers in the material. For each such direction, or corresponding momentum value of a charge carrier, there is a so-called forbidden band between the valence band of the semiconductor and the respective conduction band. The conduction band curves, near both the Brillouin zone center and the Brillouin zone edge, are essentially parabolic in nature and have well-defined minima. These curves describe what are commonly called valleys. The valley centered at zero momentum is known as the direct gap valley; and others are indirect gap valleys.

Heretofore, in most semiconductive maser and laser devices, regardless of frequency, most transitions have taken place between the conduction band and the valence band or between the conduction band and specific energy levels within the forbidden band. It can further be shown that, because the transitions are between discrete and well-defined energy levels, only frequencies within a relatively narrow oscillation bandwidth can be radiated. Even if one frequency within that band can be variably selected for oscillation, the range of tuning available by changing the selected frequency is very limited.

In the copending patent application of J. A. Copeland III, Ser. No. 812,115, filed April 1, 1969, now U.S. Pat. No. 3,617,911 and assigned to the assignee hereof, it is shown that a broadband maser can be obtained by employing a multiple valley semiconductive material of the type commonly used for Gunn-effect oscillations, applying an electric field to it to provide a population inversion between a pair of levels within a continuum of levels in a conduction band, and avoiding the onset of Gunn oscillations by the use of a material having a sufficiently small product of doping and length ($nL$) along the direction of application of the field.

Nevertheless, it is extremely difficult to achieve a suitable compromise that will both inhibit the Gunn oscillations and provide a desirably intense output of the stimulated coherent radiation.

Accordingly, it would be desirable to overcome the foregoing limitations of such broadband, tunable devices for the stimulated emission of coherent radiation.

SUMMARY OF THE INVENTION

According to our invention, the desired device for the stimulated emission of coherent radiation is obtained by optically pumping the multiple valley semiconductive material and by applying to the body of material an electric field outside the range for Gunn-effect instabilities but sufficient to create the intervalley transfer of excited charge carriers. This sufficient field is still considerably smaller than the field needed in the above-cited patent application of J. A. Copeland III, that is, in the absence of optical pumping.

It is one characteristic of our invention that the optical pumping can be done either from the valence band, preferably by means of two-photon absorption, or by pumping from an impurity level or analogous level within the forbidden band.

A further optional feature of our invention resides in the use of a magnetic field to increase available gain at the expense of oscillation bandwidth by providing discrete energy levels below the intervalley energy gap.

It is a further aspect of our invention that it is adaptable both to laser embodiments operating in the microwave or millimeter wave range with the assistance of suitable metallic waveguides or cavities or to lasers operating in the submillimeter wave range, typically with the assistance of a resonator of the type known as an optical resonator.

According to a further feature of our invention, mixed semiconductive crystals are advantageously used as the active medium for our masers, since selection of the mixture ratio controls the size of the intervalley energy gap, and thus determines the choice of photon energy for pumping and the frequency limits of the oscillation bandwidth. One other advantage of mixed semiconductive crystals is that the intervalley energy gap can be made smaller than the optical phonon energy. In this case, the process of the thermalization of excited carriers by optical phonon scattering is eliminated.

More specifically, if the intervalley energy gap is made smaller than 4 $kT$ where $k$ is Boltzmann's constant and T the sample absolute temperature, there will be no Gunn oscillations, regardless of the value of the applied electric field. This relationship is one of the possible alternative techniques for avoiding Gunn instabilities.

BRIEF DESCRIPTION OF THE DRAWING

Further features and advantages of our invention will become apparent from the following detailed description, taken together with the drawing, in which.

DESCRIPTION OF ILLUSTRATIVE EMBODIMENTS

Figure 1:
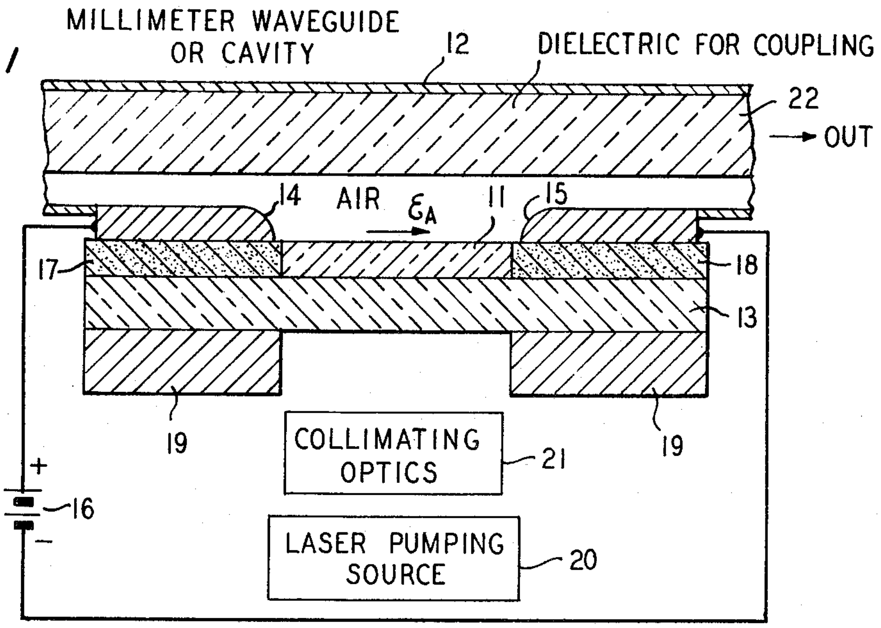
FIG. 1 is a partially pictorial and partially schematic illustration of a first embodiment of our invention.

In the illustrative embodiment of FIG. 1, a millimeter wave maser species of our invention is shown.

The active medium 11, a mixed semiconductive crystal of aluminum gallium arsenide ($Al_yGa_{1-y}As$), is placed inside or in coupling relationship to, a millimeter waveguide or cavity 12. It should be understood that for oscillations the ends of this cavity (not shown) would be partially closed, whereas for a millimeter wave amplifier, a simple millimeter wave waveguide is suitable.

Inserted into one wall of waveguide 12 is the maser assembly including crystal 11, a transparent dielectric substrate 13, such as sapphire or insulating GaAs, contacts 14 and 15 which are connected respectively to the positive and negative terminals of the dc voltage bias source 16, and the highly conducting bodies of material 17 and 18, illustratively indium or Wood's metal, which facilitate contact between the contacts 14 and 15 and crystal 11. The resulting electric field in crystal 11 is directed from left to right, as shown.

In order to improve heat dissipation through the dielectric substrate 13, a copper block heat sink 19, preferably an annulus, is disposed on the lower surface of substrate 13. The pumping radiation from a laser pumping source 20 is collimated by suitable collimating optics 21 and directed through the center aperture of annulus 19, through substrate 13, and into crystal 11.

We consider that the following additional details are helpful in implementing the embodiment of FIG. 1. A dielectric body 22 is illustratively inserted into waveguide 12 above the maser assembly but separated therefrom by a somewhat smaller region of air or dielectric gas in order to improve the coupling from the maser assembly into the waveguide. The particular aluminum gallium arsenide crystal 11 is chosen by selecting $y$ to be less than 0.44. Its uncompensated charge carrier concentration is $10^{15}$holes/cm$^{-3}$. In this instance, P-type material is used in order to provide that the conduction band is completely empty.

The length of crystal 11 in the direction of the field is illustratively 5 millimeters, its width 5 millimeters, and the thickness one-half millimeter in the direction of pump light propagation.

Figure 2:
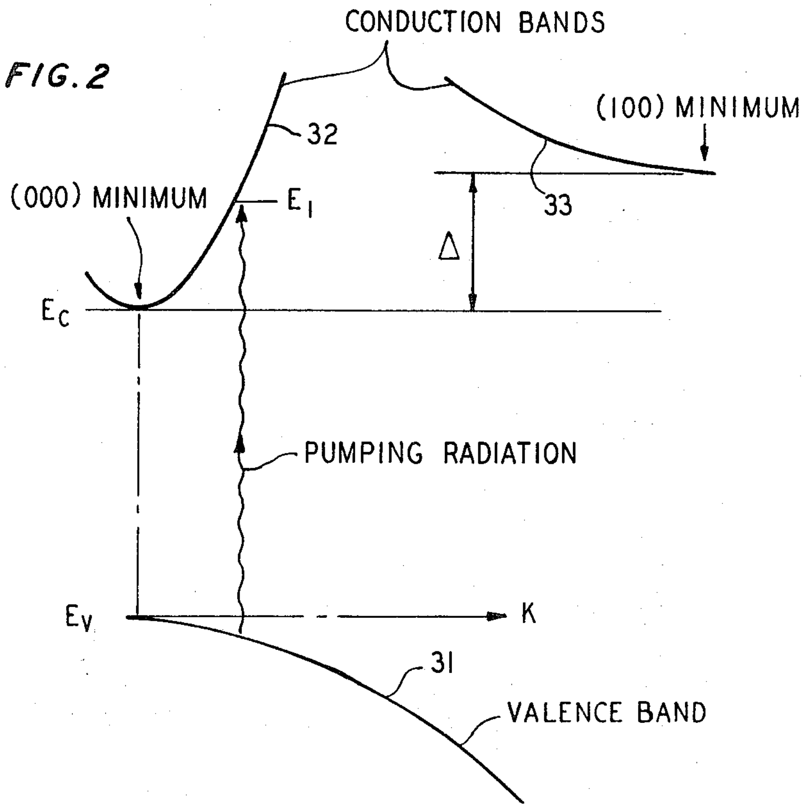
FIGS. 2 and 3 show curves useful in explaining the operation of our invention.

The operation of the embodiment of FIG. 1 can be understood by reference to the curves of FIG. 2. In the curves of FIG. 2, the valence band of crystal 11 is represented by curve 31 and the two lowest valleys of the conduction bands are represented by curves 32 and 33. The curve 32 is centered at the zero value of momentum $k$. The curve 33 has its minimum value located at a substantial value of the momentum, $k$. The physical designations of these valleys are (000) and (100), respectively, as shown on the drawing.

It will be noted that the minimum of the direct gap valley 32 is separated from the valence band 31 by a forbidden band equal to $E_c - E_v$ in energy. The minimum of the indirect gap valley 33 is separated from the valence band by an energy which is greater than the energy of the foregoing forbidden band by an amount $\Delta$. This relationship of the two valleys is that of a direct bandgap semiconductor. It can be shown that an indirect bandgap semiconductor, in which the relationship is reversed, will work equally well for purposes of our invention. $\Delta$ should be less than the energy of any absorptive transition in crystal 11 to prevent reabsorption of the stimulated radiation.

Assuming that laser pumping source 20 operates at a wavelength of about 1 micrometer, it is necessary for the optical pumping from valence band 31 to conduction band 32 to occur by two-photon absorption of the pumping radiation, since the energy difference $E_c - E_v$ is greater than the energy of a single photon of the pumping radiation for the above-stated composition of crystal 11. We select the laser pumping intensity per unit area to be $\approx 1$ megawatt for two-photon pumping. This pumping excites carriers to about the energy level labeled $E_1$ which is lower than the minimum of the (100) valley.

Moreover, we chose the direct current voltage of the source 16 to be in the range from 1 to 500 volts for the given length of crystal 11, the exact value of voltage gradient in crystal 11 being sufficient in practice to raise the energy of the excited charge carriers enough to produce circulation of the carriers between the two valleys; for example, from the $E_1$ level to at least the minimum of the (100) valley. The gradient needed depends on pumping photon energy and on $\Delta$.

The purpose of the voltage supplied by source 16 is to circulate the charge carriers between the level to which they have been pumped in valley 32 and the minimum of valley 33. The source 16 supplies any energy necessary for the transfer to the indirect gap valley, from which the charge carrier is then transferred back to the direct gap valley 32 by intervalley scattering. Especially if $\Delta$ is greater than 4 $kT$, the additional supplied energy probably should not be substantially greater than that necessary, that is, $\Delta - (E_1 - E_c)$. This shuttling back and forth of the charge carriers in response to source 16 creates the peak of charged carrier population in valley 32 at an energy near the energy of the minimum of valley 33. Thus, the population inversion occurs only in the valley 32 within continuum states. By continuum states, we mean the energy states forming a continuous band without apparent quantization in valley 32 at or below the level of the minimum of valley 33. The maser can be tuned to oscillate at any one frequency within the oscillation band, which includes the frequencies of nearly all radiative transitions within the above-described continuum. The lower laser level is typically the minimum of the valley 32, although it could also be a higher level in the continuum, depending on relative populations. The photon energy of the stimulated radiation is less than $\Delta$ in every case.

The broad oscillation bandwidth is a desirable result for the purposes of our invention if sufficient gain is retained to support the stimulated emission of coherent radiation. This result is likely in the case illustrated in FIG. 1 in which the stimulating of the radiation involves a millimeter waveguide or cavity, since very low losses are incurred. Further, the broad oscillation bandwidth means that the stimulated radiation or the cavity can be tuned over a tuning range significantly broader than that provided in other maser devices.

It is also possible to provide in the embodiment of FIG. 1 for a mode of operation in which the optical pumping occurs from a selected impurity energy level in the forbidden band. Illustratively, the crystal 11 could be doped to be N-type with a charge carrier concentration of $10^{18}$ electrons/cm$^3$.

Figure 3:
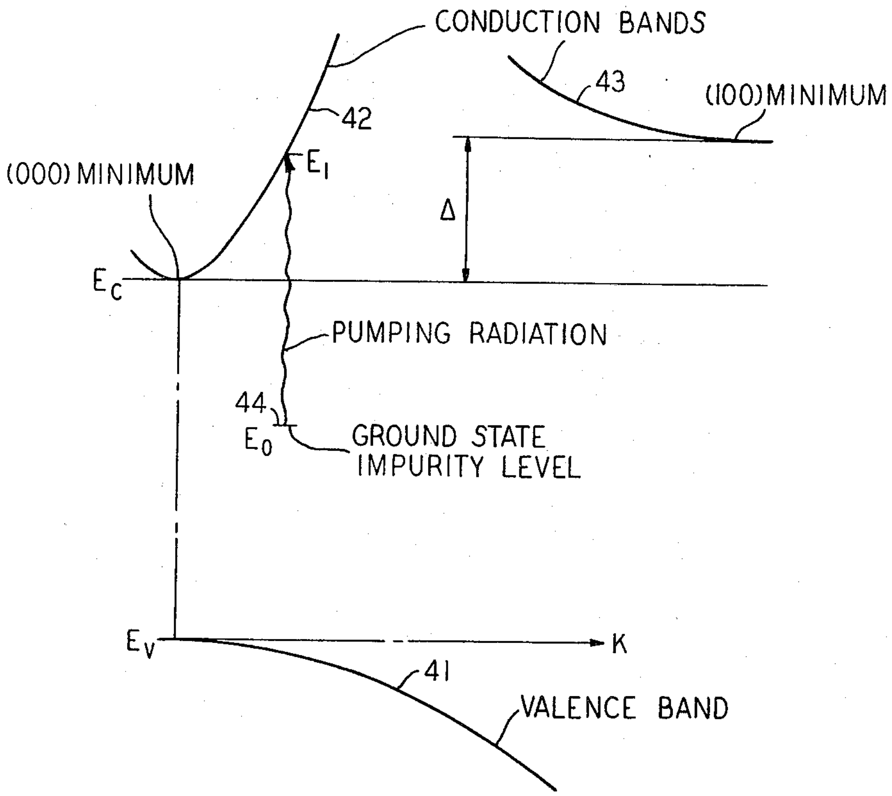

The operation of such a modified embodiment arranged as in FIG. 1 can be explained by reference to the curves of FIG. 3. The curves 41, 42 and 43 are analogous to curves 31 through 33 of FIG. 2, with the exception that the impurity energy level 44 is provided in the forbidden band by the dopant impurity. This is labeled a ground state impurity level because this impurity level is populated with charge carriers which are pumped to the conduction bands by the optical pumping radiation from source 20.

In this case, two-photon absorption is not selected as the pumping mechanism. Depending on the value of $y$, the exact location of the impurity energy level and the available tuning range of the pumping source 20, it may be feasible to employ the same pumping laser source 20 to provide the pumping by means of absorption of single photons.

While millimeter waveguides and cavities have very low loss and can enable the broadest oscillation bandwidth over which tuning can be accomplished, some sacrifice of possible tuning range becomes desirable if it is desired to operate at substantially higher frequencies, for example, in the submillimeter wave range. In that case, the simplest resonator that can be employed to provide suitable power outputs will be a resonator of the optical type, as shown in FIG. 4.

Figure 4:
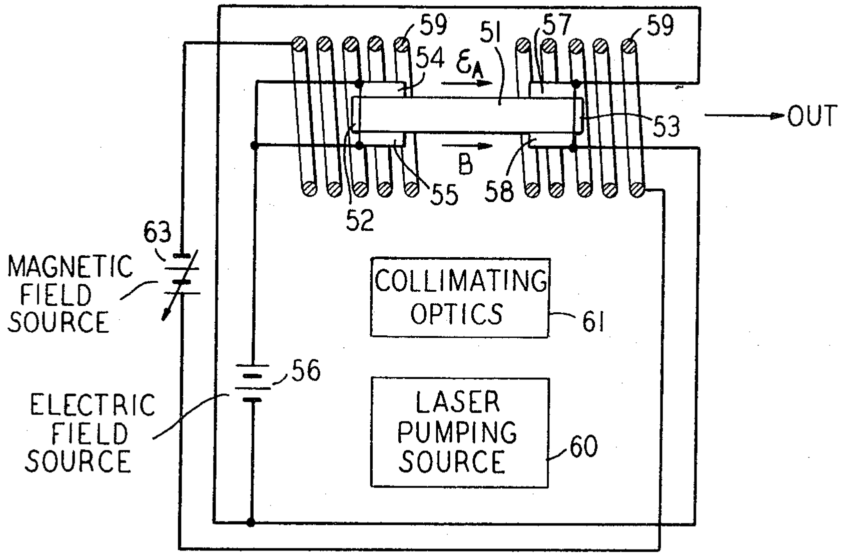
FIG. 4 shows a partially pictorial and partially schematic illustration of a modified embodiment of our invention employing a resonator of the optical type.

Thus, in FIG. 4, the semiconductive crystal 51 is illustratively $Al_yGa_{1-y}As$ where $y$ is less than 0.44, so that $\Delta$ is between 0 and 0.35 eV; and its unbalanced charge carrier concentration ($10^{15}$ holes/cm$^3$) is the same as first described for FIG. 1. Crystal 51 is provided with the end reflectors 52 and 53 forming the optical resonator. The electric field E is provided as before by suitable contacts to crystal 51. The uniformity of the electric field may be facilitated by providing like contacts 54 and 55 on top and bottom surfaces at one end of crystal 51, both being illustratively connected to the positive terminal of source 56. Like terminals 57 and 58 are similarly disposed on the top and bottom surfaces of crystal 51 at the opposite end and are both connected to the negative terminal of source 56.

In order to increase available gain at the expense of oscillation bandwidth, a magnetic field is supplied collinearly with the electric field by a suitable field coil 59, which is split in half to facilitate illumination of crystal 51 by the radiation from laser pumping source 60, as collimated by optic 61. The split field coil 59 is arranged in conventional manner to provide a substantially uniform magnetic field in crystal 51 and is energized from the variable voltage source 63 which supplies current to create the magnetic field.

In the operation of the embodiment of FIG. 4, charge carriers are pumped to the upper laser level in the conduction bands by two-photon absorption, as explained above with reference to FIG. 2. While a full set of curves for the embodiment of FIG. 4 is not shown, the principal change from the curves of FIG. 2 would involve the splitting of the continuum energy levels above the illustrated conduction band curves 32 and 33 into a series of energy levels, commonly called Landau-energy levels.

While the electric field supplied by source 56 is still effective to create the intervalley transfer of the excited charge carriers, the upper laser level now becomes a Landau-energy level in the direct gap valley 32 disposed just in the vicinity of the energy level at which the peak of the population of the excited charge carriers occurred in FIG. 1, e.g., at or below the minimum of valley 33. The well-defined upper laser level provided by such a Landau-level increases available gain so that oscillation can still be obtained in spite of the greater losses inherent in the optical resonator of FIG. 4. In other respects, the operation of the embodiment of FIG. 4 is similar to that of FIG. 1.

It should be appreciated that the foregoing embodiments of the invention can be modified by the use of a great many other mixed semiconductive crystals, such as the III–V crystals $GaAs_{1-y}B\&y$, $Al_yIn_{1-y}As$, $Al_yIn_{1-y}P$, et cetera, and by 1_use of a great many other pumping laser sources. It should be noted that many powerful pumping laser sources are now available in the visible and near infrared region of the spectrum and that many of them are sufficiently powerful to facilitate two-photon pumping. For example, a dye laser pump can increase the overall practical tuning range because of its own tunability.

A further specific modification of FIGS. 1 and 4 is the selection of Δ, by appropriate choice of a mixed crystal, to be less than 4 $kT$, where $k$ is Boltzmann's constant and T is the absolute temperature in compatible units. In that case, the strength of the supplied electric field is of reduced importance, as Gunn instabilities are prevented.

We claim:

1. A laser of the type comprising a body of a multiple valley semiconductive material and means for producing the stimulated emission of coherent radiation from a radiative transition not crossing the forbidden band, characterized in that said producing means comprises means for optically pumping said body to generate excited carriers in a band including said transition, and means for applying an electric field to said body to invert the populations of the levels of said transition, said field having a strength outside the range in which Gunn-effect instabilities are possible.

2. A laser of the type claimed in claim 1 in which the multiple valley semiconductive material is a direct gap material selected to have the indirect gap valley separated from the direct gap valley by an energy difference that is less than any energy of any absorptive transition is said material, said radiative transition having a photon energy less than said energy difference.

3. A laser of the type claimed in claim 1 in which the means for optically pumping said body includes a source providing transfer of charge carriers across the forbidden band by two-photon absorption in said body.

4. A laser of the type claimed in claim 1 in which the multiple valley semiconductive material has a selected impurity level within the forbidden band and in which the means for optically pumping said body includes a source providing transfer of charge carriers from said impurity level to the band including said radiative transition in said body.

5. A laser according to claim 1 in which the body of semiconductive material is a mixed crystal of two III–V semiconductive compounds, the mixture ratio being selected to determine the energy difference of the direct gap and indirect gap valleys.

6. A laser according to claim 5 in which the body of semiconductive material is a mixed crystal selected from the group of mixed crystals consisting of $A1_yGa_{1-y}As$, $GaAs_{1-y}P_y$, $A1_yIn_{1y}As$, and $A1_yIn_{1-y}P$.

7. A laser according to claim 1 including means for applying a magnetic field to said body to produce a well-defined upper level for said radiative transition, said modified level having an energy width that increases available gain at the expense of oscillation bandwidth.

8. A laser according to claim 1 in which the body of semiconductive material is a mixed semiconductive crystal selected to have an indirect gap valley separated from the direct gap valley by an energy difference smaller than 4 $kT$, where $k$ is Boltmann's constant and T is the absolute temperature of said body in compatible units.

* * * * *